(12) United States Patent
Crippen et al.

(10) Patent No.: US 8,023,263 B2
(45) Date of Patent: *Sep. 20, 2011

(54) LATCH FOR SECURING A HARDWARE COMPONENT INTO A COMPONENT BAY

(75) Inventors: Martin Joseph Crippen, Apex, NC (US); Brian Michael Kerrigan, Cary, NC (US); Charles William Piper, Burlington, NC (US); Brian Alan Trumbo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/119,380

(22) Filed: May 12, 2008

(65) Prior Publication Data

US 2009/0279249 A1   Nov. 12, 2009

(51) Int. Cl.
*H05K 7/12* (2006.01)

(52) U.S. Cl. ............ 361/679.58; 361/679.33; 312/223.1

(58) Field of Classification Search ............. 361/679.35, 361/679.38, 786–789, 679.32–679.39, 724–727, 361/679.58; 312/223.1–223.2
See application file for complete search history.

(56) References Cited

U.S. PATENT DOCUMENTS

| | | | | |
|---|---|---|---|---|
| 3,575,482 | A * | 4/1971 | MacMaster et al. | 312/332.1 |
| 5,575,529 | A * | 11/1996 | Dowdy et al. | 312/223.2 |
| 6,247,944 | B1 | 6/2001 | Bolognia et al. | |
| 6,325,353 | B1 | 12/2001 | Jiang | |
| 6,378,965 | B1 * | 4/2002 | Reznikov et al. | 312/332.1 |
| 6,421,236 | B1 * | 7/2002 | Montoya et al. | 361/679.58 |
| 6,483,107 | B1 * | 11/2002 | Rabinovitz et al. | 250/239 |
| 6,515,855 | B1 | 2/2003 | Yen-Kuang | |
| 6,560,098 | B1 | 5/2003 | Beinor, Jr. et al. | |
| 6,606,256 | B1 | 8/2003 | Lee et al. | |
| 6,637,719 | B2 | 10/2003 | Jiang | |
| 6,820,953 | B2 * | 11/2004 | Wojcik | 312/332.1 |
| 6,854,174 | B2 | 2/2005 | Jiang | |
| 6,879,495 | B2 | 4/2005 | Jiang | |
| 6,891,723 | B1 * | 5/2005 | Lin et al. | 361/679.33 |
| 7,012,803 | B1 | 3/2006 | Austin et al. | |
| 7,023,693 | B2 * | 4/2006 | Yuan et al. | 361/679.39 |
| 7,139,166 | B2 | 11/2006 | Marcade et al. | |
| 7,203,067 | B2 * | 4/2007 | Beall et al. | 361/726 |
| 7,251,132 | B1 * | 7/2007 | Paul et al. | 361/679.33 |
| 7,254,017 | B2 * | 8/2007 | Peng et al. | 361/679.33 |
| 7,423,869 | B2 * | 9/2008 | Su | 361/679.33 |
| 7,540,574 | B2 * | 6/2009 | Wu et al. | 312/223.2 |
| 7,675,754 | B2 * | 3/2010 | Barina et al. | 361/747 |
| 2005/0062378 | A1 * | 3/2005 | Wojcik | 312/332.1 |
| 2006/0087762 | A1 | 4/2006 | Ohishi | |

* cited by examiner

*Primary Examiner* — Jayprakash N Gandhi
*Assistant Examiner* — Ingrid Wright
(74) *Attorney, Agent, or Firm* — Cynthia G. Seal; Jeffrey L. Streets

(57) ABSTRACT

A latch apparatus and method to facilitate leveraged insertion of a component into a component bay to an interfaced position, securing of the component in the component bay when the component interfaces with a host computer, leveraged dislodgement of the component from its interfaced position for removal of the component from the component bay, and proper positioning of the latch apparatus upon insertion of the component housing to ensure proper engagement of the latch apparatus with the component bay for leveraged insertion and removal. One latch apparatus comprises a frame adapted to be secured to a proximal end of a component housing, a handle pivotally secured to the frame, and an extendable arm slidably secured to a distal end of the handle and biased toward an extended position, wherein the distal end of the extendable arm has a distally extending latch key for engaging a slot in the component bay.

20 Claims, 9 Drawing Sheets

LATCH FOR SECURING A HARDWARE COMPONENT INTO A COMPONENT BAY

BACKGROUND OF THE INVENTION

1. Field of the Invention

The present invention relates to a latch for securing a hardware component, such as a disk drive, into a component bay forming part of a computer system.

2. Background of the Related Art

Hard disk drives generally include a data storage disk secured within a housing that may be coupled to a carrier, sometimes referred to as a tray, which is adapted to be received and secured in a drive bay to interface with a host computer. For example, a generally circular data storage disk is rotatably coupled within the housing in a position to rotate relative to the housing and about a generally vertical axis. A disk reader head is also movably coupled within the housing to controllably track across the rotatable data storage disk to retrieve data stored on the disk, or to retrievably write data to the disk.

A plurality of hard disk drives may be arranged within an array of bays within a chassis. This configuration enables a host computer to interface with numerous hard disk drives, each of which is replaceable independently of the others. Each drive bay may include a receiving port for electronically docking the hard disk drive secured within that bay. For example, a hard disk drive interface connector may be disposed at a leading end of each hard disk drive, and the interface connector may plug into a mating connector positioned within the host system and at the end of the bay to electronically couple the hard disk drive to the host computer.

Data storage density may be improved using compact hard disk drive carriers that can be efficiently installed within the bays of the host system along side other hard disk drive carriers. The host computer may be designed to continue to operate and to communicate with a plurality of hard disk drives as an individual hard disk drive carrier is removed or "hot swapped" from a drive bay or as a replacement hard disk drive carrier is installed within the vacant bay to interface with the host computer.

A hard disk drive carrier may be secured to a hard disk drive housing and inserted into a drive bay, for example, with an interface connector at the leading end of the hard disk drive being inserted into the mouth of the bay first. The hard disk drive carrier may then be displaced into the bay to an interfaced position where the interface connector of the hard disk drive is docked with a mating connector of the host system. The hard disk drive carrier should secure the hard disk drive in the interfaced position using a latch apparatus to prevent the hard disk drive carrier from being inadvertently displaced from the interfaced position during use of the hard disk drive. The motor that rotates the hard disk and the actuator that positions the head to read from the hard disk or write to the hard disk typically cause vibrations that can result in the hard disk drive becoming dislodged from the interfaced position or disconnected from the host system in the absence of the latch apparatus.

BRIEF SUMMARY OF THE INVENTION

One embodiment of the present invention provides a hard disk drive carrier, comprising a frame adapted to be secured to a proximal end of a hard disk drive housing, a handle pivotally secured to the frame intermediate a proximal end and a distal end of the handle, and an extendable arm that is slidably secured to the distal end of the handle and biased toward an extended position. The extendable arm has a distally extending latch key formed on a distal end of the extendable arm.

In a preferred embodiment, the hard disk drive is designed to assist in the installation of the carrier into a bay. Accordingly, pivotal movement of the handle from an open position to an intermediate position deploys the latch key beyond a lateral edge of the frame for engagement with a slot in a disk drive bay sidewall. Further pivotal movement of the handle from the intermediate position to closed position causes the extendable arm to retract to follow the contour of the disk drive bay sidewall and draws the latch key in a proximal direction.

In a further preferred embodiment, the hard disk drive is designed to assist in the removal of the carrier from a bay. Accordingly, pivotal movement of the handle from a closed position to an intermediate position causes the stop arm to engage the bay and the extendable arm to extend to follow the contour of the disk drive bay sidewall and moves the latch key in a distal direction. Further pivotal movement of the handle from the intermediate position to the open position biases the stop arm against the bay to disengage the hard disk drive from its coupling with a host computer and disengages the latch key from the slot in the disk drive bay sidewall.

Another embodiment of the invention provides a method for docking and securing a hard disk drive into a disk drive bay. The method comprises securing the hard disk drive to a hard disk drive carrier and inserting the hard disk drive carrier into a drive bay between a pair of opposing channels, wherein one of the opposing channels has a slot in a proximal end. According to the method, a latch key on one side of the carrier is aligned with the slot by continuing insertion of the hard disk drive carrier until a stop arm limits further insertion. A handle that is pivotally secured to the carrier is pivoted to deploy the latch key into the slot. Continued pivoting of the handle towards a closed position imparts a docking force to the hard disk drive carrier and displaces the hard disk drive until a connector on the hard disk drive has interfaced with a mating connector secured relative to the drive bay. Optionally, the handle may be locked in the closed position.

Yet another embodiment of the invention provides a method for undocking and releasing a hard disk drive from a disk drive bay. Accordingly, the foregoing method may including pivoting the handle from the closed position towards the open position to impart a dislodging force to the hard disk drive carrier and displace the hard disk drive until the connector on the hard disk drive disconnects from the mating connector.

BRIEF DESCRIPTION OF THE APPENDED DRAWINGS

DETAILED DESCRIPTION OF THE INVENTION

Figure 1:
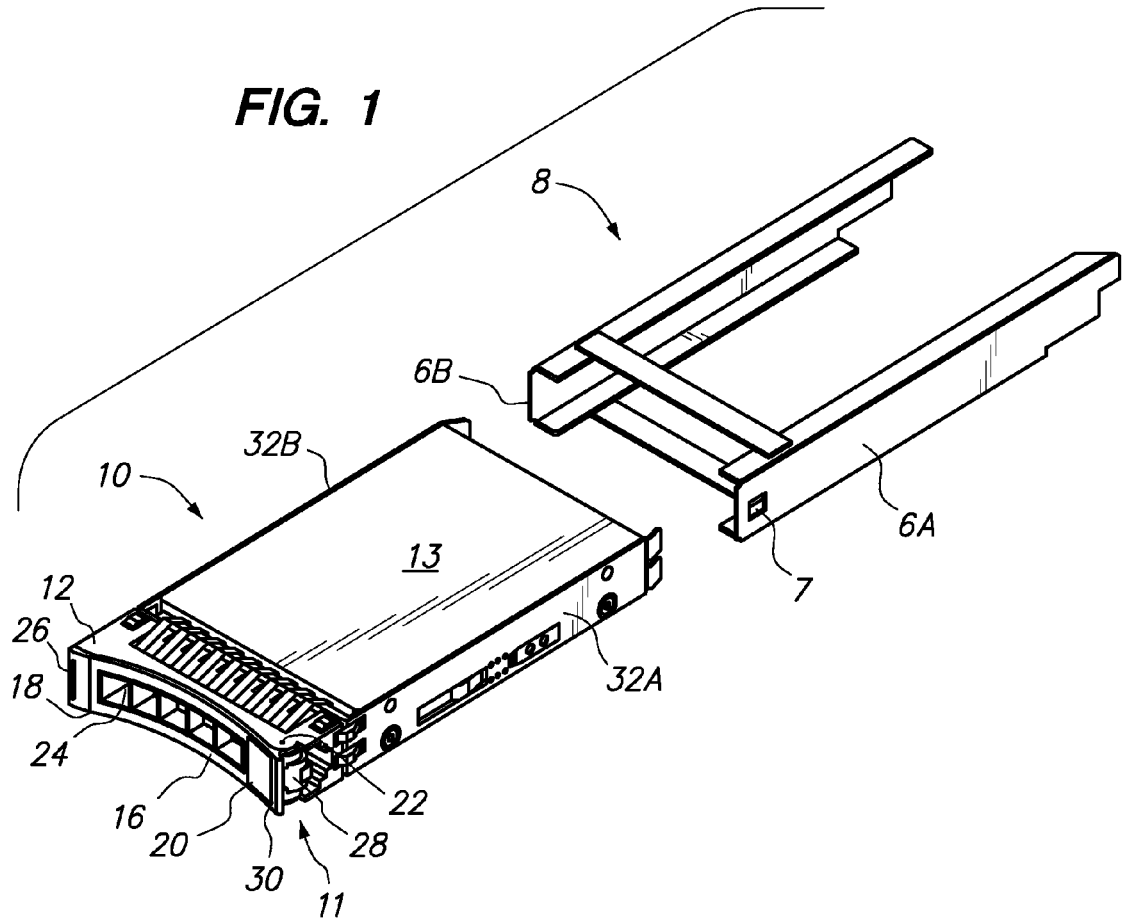
FIG. 1 is a perspective view of one embodiment of a hard disk drive (HDD) carrier of the present invention aligned for installation within a HDD cage that forms a receiving bay of a chassis.

The present invention provides a latch for securing a hardware component, such as a disk drive, into a component bay forming part of a computer system. Although the invention is described herein in the context of a hard disk drive carrier, it should be recognized that the latch may be implemented to secure other hardware components into a component bay in a similar manner. The latch is particularly beneficial for securing a hardware component has an external connector that requires electronic coupling to a mating connector positioned within the component bay.

One embodiment of the present invention provides a hard disk drive carrier, comprising a frame adapted to be secured to a proximal end of a hard disk drive housing, a handle pivotally secured to the frame intermediate a proximal end and a distal end of the handle, and an extendable arm that is slidably secured to the distal end of the handle and biased toward an extended position. The extendable arm has a distally extending latch key formed on a distal end of the extendable arm.

In a preferred embodiment, the hard disk drive carrier is designed to assist in the installation of the hard disk drive into a bay. Accordingly, pivotal movement of the handle from an open position to an intermediate position deploys the latch key beyond a lateral edge of the frame for engagement with a slot in a disk drive bay sidewall. Further pivotal movement of the handle from the intermediate position to closed position causes the extendable arm to retract to follow the contour of the disk drive bay sidewall and draws the latch key in a proximal direction.

In a further preferred embodiment, the hard disk drive is designed to assist in the removal of the carrier from a bay. Accordingly, pivotal movement of the handle from a closed position to an intermediate position causes the stop arm to engage the bay and the extendable arm to extend to follow the contour of the disk drive bay sidewall and moves the latch key in a distal direction. Further pivotal movement of the handle from the intermediate position to the open position biases the stop arm against the bay to disengage the hard disk drive from its coupling with a host computer, and also disengages the latch key from the slot in the disk drive bay sidewall and moves the latch key within the lateral edge of the frame.

In yet another embodiment, the extendable arm is slidably secured to the handle by a pin and slot coupling. Preferably, the extendable arm has a limited range of extension so that the latch key can be consistently aligned with a slot in the drive bay when the extendable arm is fully extended. Preferably, the extendable arm is biased by a spring.

Furthermore, the extendable arm may also include a cam surface that engages and follows the disk drive bay sidewall between the intermediate position and closed position of the handle. The cam surface is generally positioned adjacent the latch key in the direct of pivotal engagement against the disk drive bay sidewall. Accordingly, the cam surface reduces the degree of friction or binding between the extendable arm and the bay sidewall so that the handle closes smoothly.

In an additional embodiment, the handle of the hard disk drive carrier is itself biased toward an open position, such as with a spring. This biasing allows the handle to remain fully open for initial insertion into the HDD bay. In this manner, the extendable arm is positioned within the lateral edge of the carrier and a stop arm is aligned with a leading edge of the HDD bay for positioning the carrier in a staging position.

Another embodiment of the invention provides a method for docking and securing a hard disk drive into a disk drive bay. The method comprises securing the hard disk drive to a hard disk drive carrier and inserting the hard disk drive carrier into a drive bay between a pair of opposing channels, wherein one of the opposing channels has a slot in a proximal end. According to the method, a latch key on one side of the carrier is aligned with the slot by continuing insertion of the hard disk drive carrier until a stop arm limits further insertion. A handle that is pivotally secured to the carrier is pivoted to deploy the latch key into the slot. Continued pivoting of the handle towards a closed position imparts a docking force to the hard disk drive carrier and displaces the hard disk drive until a connector on the hard disk drive has interfaced with a mating connector secured relative to the drive bay. Optionally, the handle may be locked in the closed position.

Yet another embodiment of the invention provides a method for undocking and releasing a hard disk drive from a disk drive bay. Accordingly, the foregoing method may including pivoting the handle from the closed position towards the open position to impart a dislodging force to the hard disk drive carrier and displace the hard disk drive until the connector on the hard disk drive disconnects from the mating connector.

In another embodiment, the latch apparatus comprises a stop arm that is coupled to, and cooperates with, the handle. The handle comprises a first end to be grasped by the user, a second end opposite the first end, and a pivotal connection there between. The stop arm of the latch apparatus may be manipulated by the user using the first end of the handle to provide: (1) positioning of the hard disk drive carrier and the latch apparatus to an initial position within the drive bay in preparation for leveraged insertion of the hard disk drive carrier; and (2) leveraged disconnection of the hard disk drive carrier from the interfaced position.

In yet another embodiment, the latch apparatus may be used to dock the hard disk drive carrier into the drive bay to interface with the host computer. The handle may be pivoted by the user from an open position to an intermediate position to engage a latch key with a slot in the drive bay, which may be a slot in a HDD cage. The handle may then be pivoted from the intermediate position to a secured position to provide leveraged displacement of the hard disk drive carrier into the bay to the docked position. Optionally, the handle may be locked in the secured position using a locking pawl to prevent inadvertent dislodging of the hard disk drive carrier from the docked position. As the handle is initially pivoted from the open position towards the engaged position, the latch key, disposed at a first end of the extendable arm, may be inserted into a slot in the drive bay. With continued pivoting of the handle from the engaged position towards the secured position, the latch key is displaced within the slot to, and then against, a proximal end of the slot. Continued pivoting of the handle to the secured position imparts a docking force through the latch apparatus and to the hard disk drive carrier to distally displace the hard disk drive carrier and hard disk drive until the hard disk drive docks with the host computer.

In a further embodiment, the latch apparatus may be used to dislodge the hard disk drive from its docked position within the drive bay to disengage from the host computer. Accordingly, the handle is pivoted by the user from the secured position to an intermediate position to disengage the latch key from the slot in the drive bay. Continued pivoting of the handle from the intermediate position towards the open position imparts a dislodging force through the stop arm to the hard disk drive carrier to dislodge the hard disk drive carrier from its docked position within the drive bay. Still further pivoting of the handle to a fully open position moves the latch key out of the slot so that the hard disk drive carrier can be removed from the drive bay.

In a still further embodiment, the latch key may be strategically positioned for being inserted into the slot in the drive bay by inserting the hard disk drive carrier to a staging position that is intermediate the removed position and the docked position within the drive bay. The hard disk drive carrier may be conveniently positioned at the staging position within the drive bay when the handle is in a fully open position so that the stop arm protrudes from the side of the hard disk drive carrier to limit the extent to which the hard disk drive carrier may be inserted into the drive bay. Deployment of the stop arm prevents insertion of the hard disk drive carrier beyond the precise position at which the latch key may be inserted into the slot in the drive bay, in the manner previously described. It should also be recognized that the carrier also can not be inserted when the handle is closed, since the latch key will extend laterally to engage the drive bay.

The hard disk drive carrier of the present invention includes a frame to which the handle is movably coupled. The frame is preferably coupled to a pair of rails that are in turn secured to a hard disk drive. The handle of the latch apparatus may be pivotally secured to the frame of the latch apparatus. Preferably, the pivotal coupling of the handle to the frame is intermediate the first end and the second end of the handle, and the pivotal coupling is disposed substantially closer to the second end of the handle to provide substantial leverage to the user upon manipulation of the first end.

It should be appreciated that various embodiments of the invention provide a latch apparatus that facilitates leveraged insertion of the hard disk drive carrier to the interfaced position within the bay without consuming an excessive amount of lateral space beyond the width of the hard disk drive, and may thereby enable an increase the density of hard disk drives that may be disposed within a given host computer system. Embodiments of the latch apparatus may also facilitate leveraged insertion and precise positioning of the hard disk drive carrier in the interfaced position, as well as leveraged dislodgement and removal of the hard disk drive carrier from the interfaced position.

FIG. 1 is a perspective view of a hard disk drive carrier 10 securing a hard disk drive 13 in alignment for installation within a drive bay 8, shown here consisting of a hard disk drive cage. The hard disk drive carrier 10 includes a frame 12 and a latch apparatus 14. The latch apparatus 14 includes a handle 16 having a first end 18 and a second end 20, and further comprising a pivot pin 22 for pivotally securing the handle 16 to the frame 12. The handle 16 may comprise an aperture 24 or a plurality of apertures to facilitate the flow of cooling air when the handle is in its secured position. The handle 16 is shown locked in its secured position using a locking pawl 26 that may be spring-biased towards its locked position. The first end 18 of the handle is engaged and secured by the locking pawl 26, whereas the second end 20 of the handle supports an extendable arm 28 and a stop arm 30 for positioning and securing the carrier 10 within the drive bay 8.

The drive bay 8 includes two generally parallel and opposing channels 6A, 6B coupled one to the other, to receive the hard disk drive carrier 10. Specifically, a pair of side rails 32A, 32B, which are secured to the frame 12 and opposing sides of the disk drive 13, are received within the channels 6A, 6B, respectively. One of the channels 6A comprises a slot 7 for receiving and cooperating with the latch apparatus 11, as described below.

Figure 2:
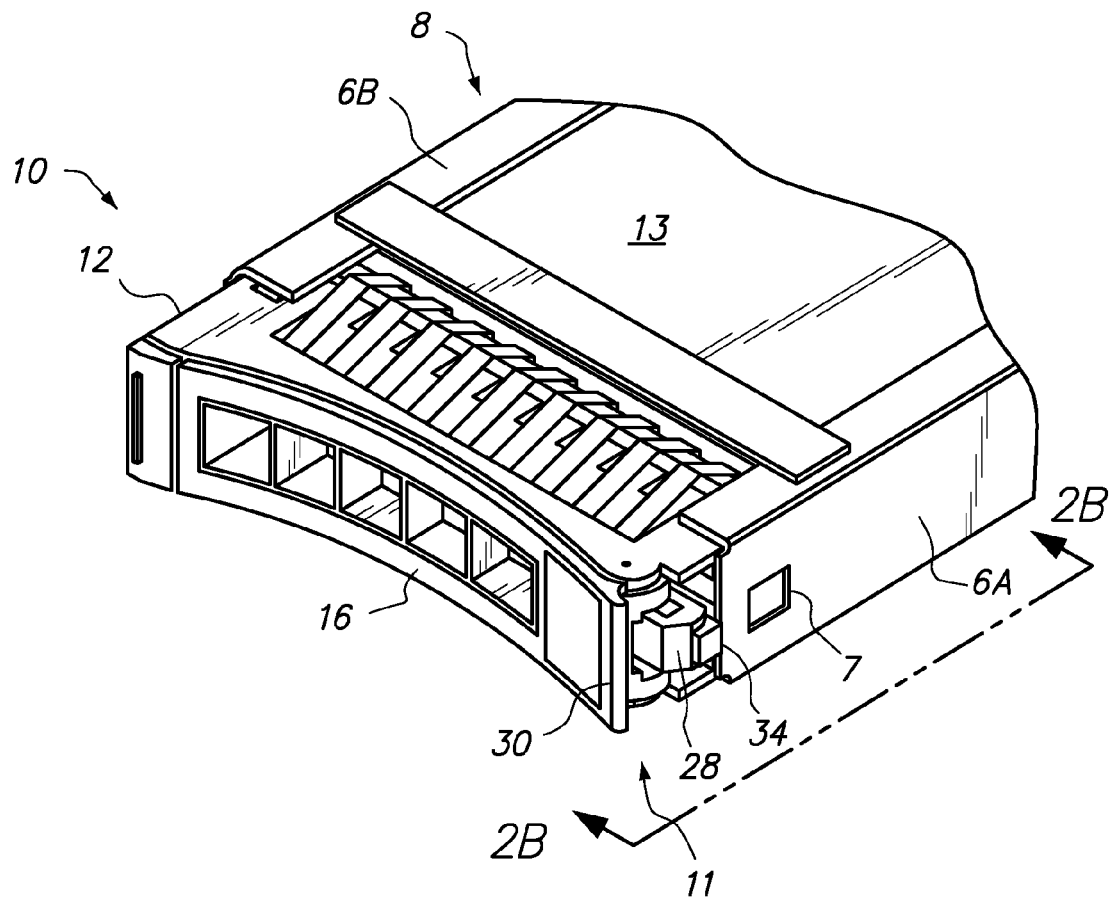
FIG. 2 is a perspective view of the HDD carrier of FIG. 1 partially inserted into the HDD cage.

FIG. 2 is a perspective view of the HDD carrier of FIG. 1 partially inserted into the HDD cage. The handle 16 is closed and locked, but the carrier 10 has not been fully received into an operable position within the drive bay 8. With the extendable arm 28 fully extended laterally beyond the right-hand edge of the carrier frame 12, the lateral position of the latch key 34 prevents the carrier 10 from advancing fully into the drive bay 8. The carrier 10 is preferably fully received into the drive bay 8 in accordance with the discussion of the figures that follows.

Figure 2B:
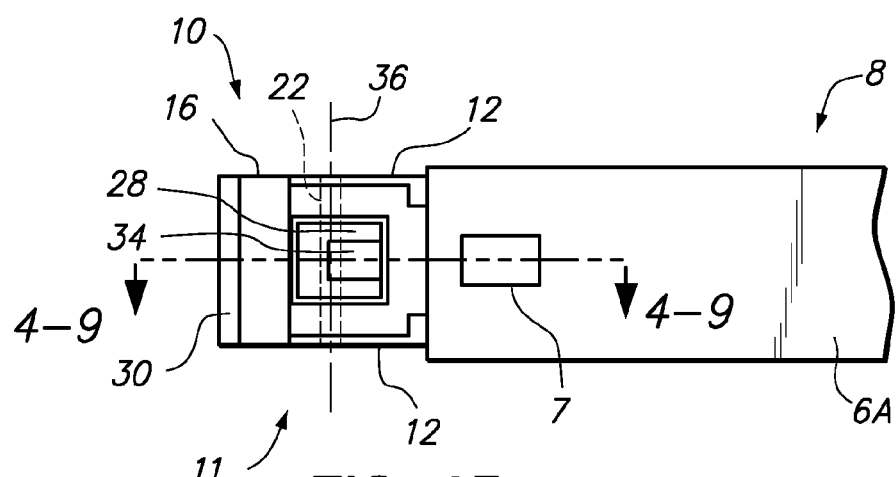
FIG. 2B is a side view of the HDD carrier of FIG. 2.

FIG. 2B is a side view of the HDD carrier 10 in the position shown in FIG. 2. With the handle 16 fully closed, the extendable arm 28 and the latch key 34 extend laterally (out of the page, as shown). The pivot pin 22 extends from the top to the bottom of the frame 12 and establishes an axis 36 about which the handle 16 pivots.

Figure 3:
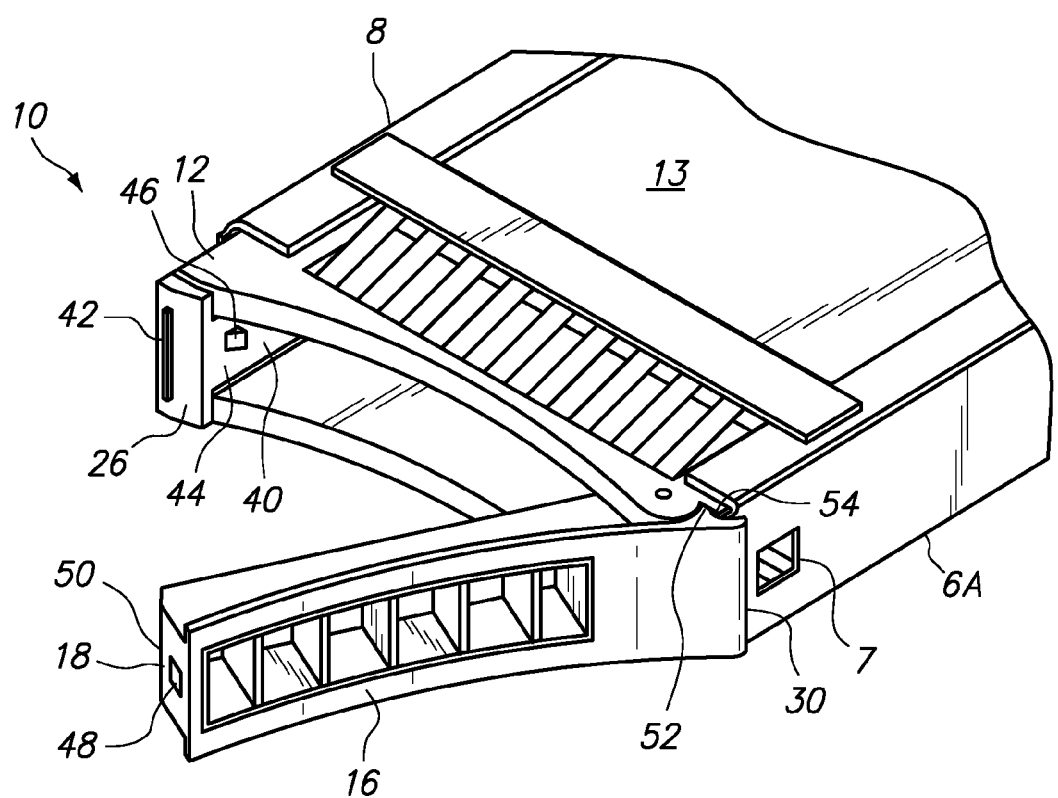
FIG. 3 is a perspective view of the HDD carrier with its handle open in preparation for securing the HDD within the HDD cage.

FIG. 3 is a perspective view of the HDD carrier 10 with its handle 16 open in preparation for securing the HDD 13 within the HDD cage or bay 8. The open handle 16 positions the extendable arm (not shown) within the lateral edge of the frame 12, such that the carrier 10 can advance into the bay 8 beyond the position shown in FIG. 2. The stop arm 30 engages the proximal end of the channel 6A to place the carrier 10 in a staging position where the extendable arm and its latch key (not shown) are laterally aligned with the slot 7.

This view also highlights one embodiment of the locking pawl 26. The locking pawl 26 is secured to the frame 12 at a first end 40 and has a pawl handle 42 that can be pulled laterally (to the left) to flex the bar 44 there between. The first end 22 of the handle 16 is disposed to pivot closed into engagement with at least a latch element 46. The first end 22 includes an inclined surface 50 that pushes the latch element 46 outward, flexing the bar 44, as the handle is closed and a recess or slot 48 for receiving the latch element 46 when the handle is fully closed. The bias in the flexed bar 44, such as a flexible plastic bar or pawl, forces the latch element 46 into the slot 48 where the latch element 46 is retained unless the pawl handle 42 is manually pulled laterally. If the handle 16 is biased toward the open position by a light spring, releasing the pawl 26 will conveniently cause the handle 16 to open until either the stop arm 30 engages the channel 6A or a handle shoulder 52 engages a frame shoulder 54.

Figure 4:
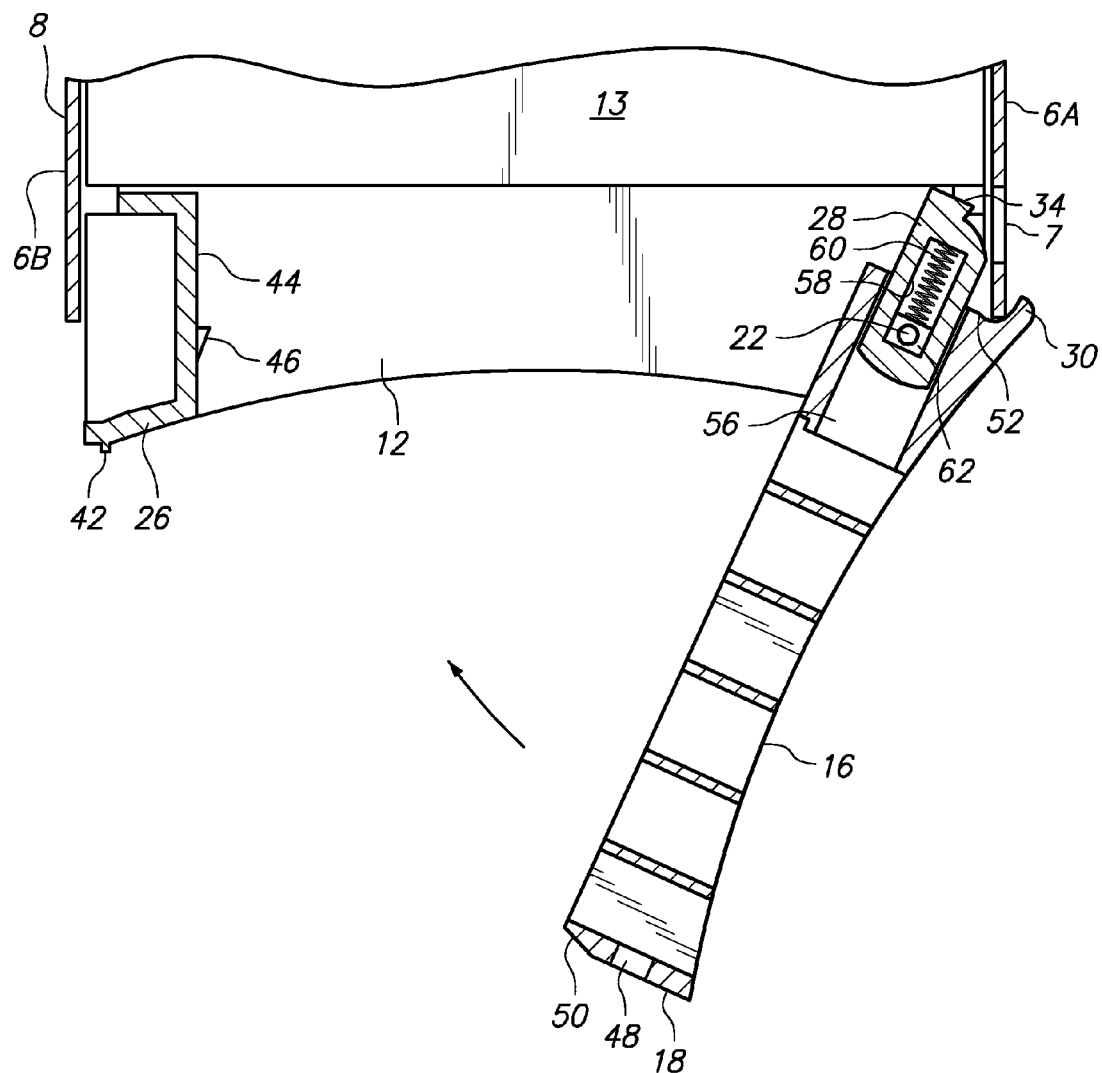
FIG. 4 is a cross-sectional plan view of the HDD carrier with the handle open according to FIG. 3 and the stop arm engaging the HDD cage.

FIGS. 4-7 are cross-sectional plan views of the HDD carrier 10 as the handle is pivoted from an open position to a closed position. FIG. 4 shows the HDD carrier 10 with the handle 16 open, consistent with FIG. 3, and the stop arm 30 engaging the channel 6A of the HDD cage 8. Accordingly, the latch key 34 is substantially laterally inward of the slot 7. The extendable arm 28 has a distal end that forms the latch key 34. The extendable arm 28 is slidably secured in a channel 56 within the handle 16. A elongate slot 58 in the extendable arm 28 receives the pivot pin 22 and a block 62 that is pivotally secured about the pivot pin 22 and allows translation of the extendably arm 28 about the block. The extendably arm 28 is biased toward an extended position (as shown) by a spring 60 that is compressed between a distal end of the slot 58 and the block 62.

Figure 5:
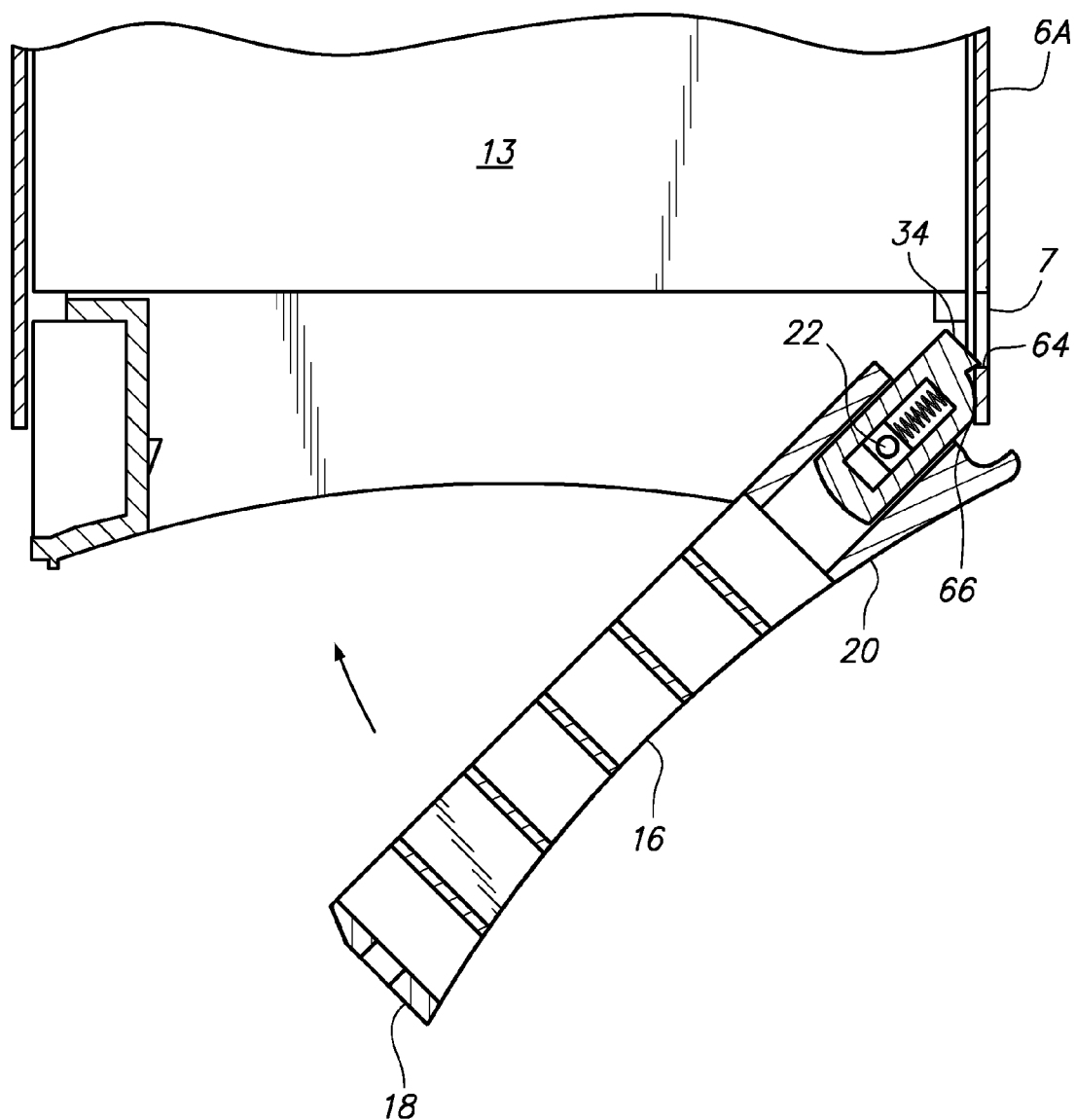
FIG. 5 is a cross-sectional plan view of the HDD carrier of FIG. 4 after the handle has been pivoted to an intermediate position to engage the latch key with the slot.

FIG. 5 is a cross-sectional plan view of the HDD carrier 10 of FIG. 4 after the handle 16 has been pivoted (approximately 30 degrees in a clockwise direction) to an intermediate position to engage the latch key 34 with the proximal end 64 of the slot 7. Pivoting of the handle 16 toward the closed position (clockwise as seen in this view of this embodiment) will further pivot the latch key 34, and indeed the distal end of the extendable arm 28, about the pivot pin 22 (clockwise) into continued engagement with the channel 6A and the slot 7. The extendable arm 28 has an inclined or curved cam surface 66 that may slide against the channel 6A. The larger dimensions of the cam surface 66 may also prevent the latch key 34 from extending unnecessarily far through the slot 7, which would increase the effective width necessary for each hard disk drive bay 8. Accordingly, the latch key 34 extends firmly into engagement with the slot 7, but not further in the lateral direction. It should be noted that the pivot pin 22 is positioned substantially closer to the second end 20 of the handle 16 as compared to the first end 18, and that this position provides for a substantial amount of leverage that can be generated at the latch key 34 by manipulating the first end 18.

Figure 6:
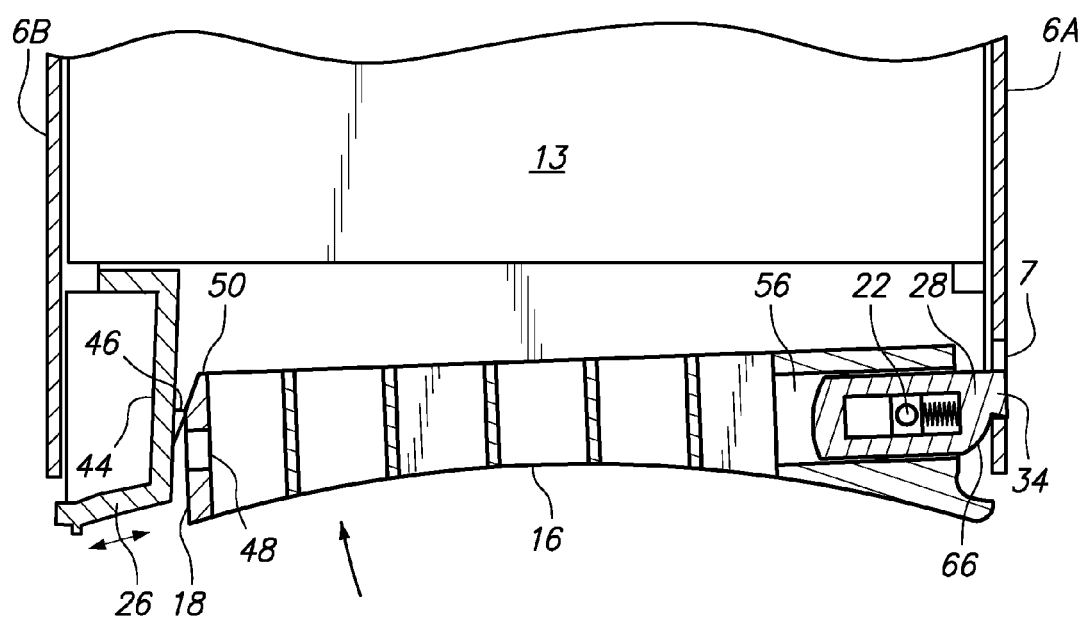
FIG. 6 is a cross-sectional plan view of the HDD carrier of FIG. 5 after the handle has been pivoted further toward a closed position to draw the HDD carrier into the HDD cage and engage a locking pawl.

FIG. 6 is a cross-sectional plan view of the HDD carrier 10 of FIG. 5 after the handle 16 has been pivoted further toward a closed position. The pivoting of the handle 26 has caused the latch key 34 to draw the HDD carrier 10 into the HDD cage or bay 8. Although not shown, this position should have already caused a connector on the hard disk drive 13 to begin coupling with a connector of the host computer system (not shown). The extendable arm 28 has retracted somewhat into the channel 56 in the handle 16 as the cam surface 66 pushes against the channel 6A. At the first end 18, the inclined surface 50 has pushed past the latch element 46 causing the latch element 46 to ride up over the end 18 and the bar 44 to flex. In the state shown, the latch element 46 of the locking pawl 26 is biased against the end 18, but not yet latched.

Figure 7:
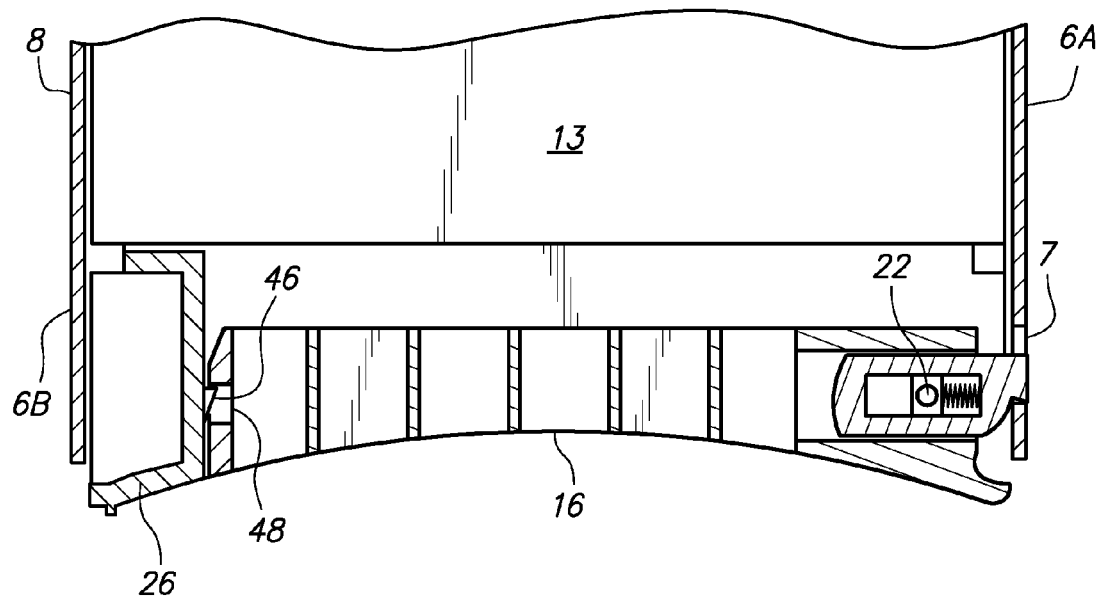
FIG. 7 is a cross-sectional plan view of the HDD carrier of FIG. 6 after the handle has reached a closed and locked position to secure the HDD carrier into the HDD cage.

FIG. 7 is a cross-sectional plan view of the HDD carrier 10 of FIG. 6 after the handle has reached a fully closed and locked position to secure the HDD carrier into the HDD cage 8. The latch key 34 holds the carrier 10 and the hard disk drive 13 in the operable/installed position with respect to the host computer system. Note that neither the latch key 34 nor any other part of the carrier 10 extends laterally beyond the boundary of the bay 8. Furthermore, the pawl latch element 46 is now received into the slot 48 to latch the handle 16 is the closed position.

Figure 8:
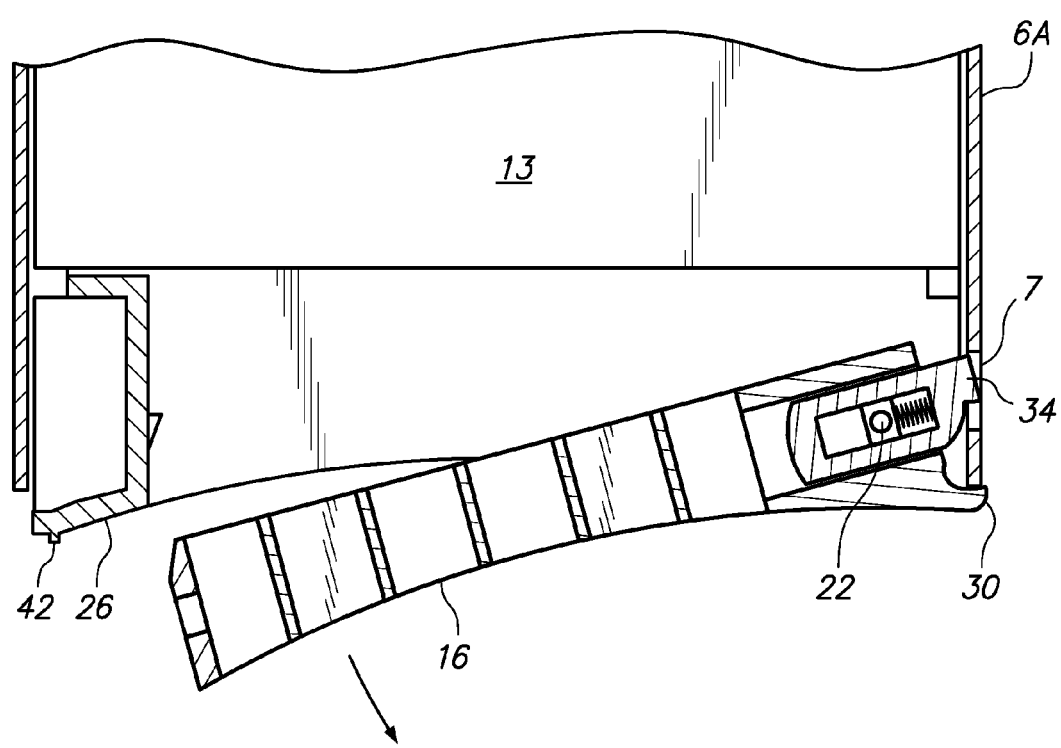
FIG. 8 is a cross-sectional plan view of the HDD carrier of FIG. 7 after the handle has been unlocked and pivoted to engage the stop arm with the HDD cage.

FIG. 8 is a cross-sectional plan view of the HDD carrier 10 of FIG. 7 after the handle 16 has been unlocked by manually pulling the pawl handle 42 laterally to flex the bar 44 and withdraw the latch element 46 out of the slot 48. The handle 16 pivots manually or under the force of a spring in the open direction to engage the stop arm 30 with the HDD cage channel 6A.

Figure 9:
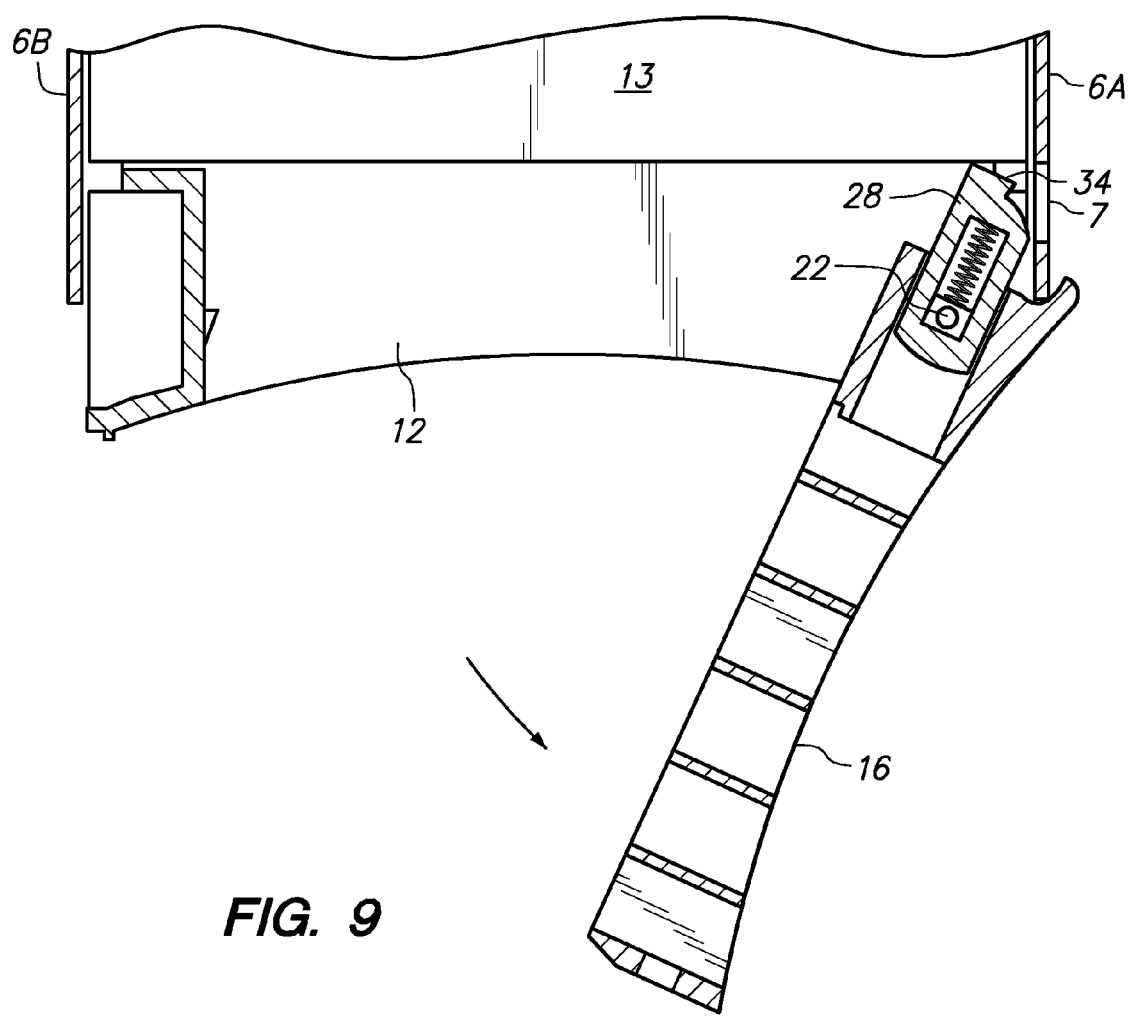
FIG. 9 is a cross-sectional plan view of the HDD carrier of FIG. 8 after the handle has reached a fully open position to unlatch the HDD carrier from the HDD cage and disengage the HDD from its coupling to a host computer system.

FIG. 9 is a cross-sectional plan view of the HDD carrier 10 of FIG. 8 after the handle 16 has been manually pulled to reach a fully open position. As the handle 16 pivots open, the stop arm 30 applies a force against the end of the channel 6A and draws the carrier 10 and hard disk drive 13 outward with respect to the bay 8. Over even a short distance, this outward movement of the hard disk drive 13 unlatches the HDD carrier 10 from the HDD cage 8 and disengages the HDD 13 from its coupling to a host computer system. With the extendable arm 28 fully within the boundary of the bay 8, the carrier 10 and hard disk drive 13 can be safely and easily withdrawn from the bay 8.

It should be recognized that the position or condition of the handle 16 or other element of the carrier 10 may be monitored by an electronic sensor for use by software applications, such as a system management module. Still further, the manual operations described herein may be automated with motors and actuators as are well known in the art.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A latch apparatus, comprising:
    a frame adapted to be secured to a proximal end of a component housing;
    a handle pivotally secured to the frame intermediate a proximal end and a distal end;
    an extendable arm slidably secured to the distal end of the handle, wherein the extendable arm has a distally extending latch key formed on a distal end of the extendable arm, and wherein the extendable arm is biased toward an extended position.

2. The latch apparatus of claim 1, wherein pivotal movement of the handle from an open position to an intermediate position deploys the latch key beyond a lateral edge of the frame for engagement with a slot in a component bay sidewall.

3. The latch apparatus of claim 2, wherein pivotal movement of the handle from the intermediate position to closed position causes the extendable arm to retract to follow the contour of the component bay sidewall and draws the latch key in a proximal direction.

4. The latch apparatus of claim 1, wherein pivotal movement of the handle from a closed position to an intermediate position causes the extendable arm to extend to follow the contour of the component bay sidewall and moves the latch key in a distal direction.

5. The latch apparatus of claim 4, wherein pivotal movement of the handle from the intermediate position to the open position retracts the latch key within the lateral edge of the frame to disengage the slot in the component bay sidewall.

6. The latch apparatus of claim 1, wherein the extendable arm is slidably secured to the handle by a pin and slot coupling.

7. The latch apparatus of claim 1, wherein the extendable arm includes a cam surface that engages and follows the component bay sidewall between the intermediate position and closed position of the handle.

8. The latch apparatus of claim 1, wherein the extendable arm has a limited range of extension so that the latch key aligns with a slot in the drive bay when the extendable arm is fully extended.

9. The latch apparatus of claim 1, wherein the extendable arm is distally biased by a spring.

10. The latch apparatus of claim 1, further comprising: a spring for biasing the handle toward an open position.

11. The latch apparatus of claim 1, wherein the handle includes a stop arm that prevents the carrier from being fully received in the component bay with the handle in the open position.

12. The latch apparatus of claim 1, further comprising a spring-biased locking pawl for securing the handle in the closed position.

13. The latch apparatus of claim 1, further comprising:
a pair of rails secured to the frame, wherein the pair of rails adapt the frame to be secured to the proximal end of the component housing.

14. The latch apparatus of claim 13, wherein each rail is securely positionable within a channel of a component bay.

15. The latch apparatus of claim 1, wherein the component housing contains a hard disk drive.

16. A method comprising:
securing a latch to a proximal end of a component housing;
inserting the component housing into a component bay between a pair of opposing channels, wherein one of the opposing channels has a slot adjacent a proximal end;
aligning a latch key on one side of the latch with the slot by continuing insertion of the hard disk drive carrier until a latch stop arm limits further insertion;
pivoting a latch handle about a pivot to slidably extend and deploy the latch key into the slot; and
continuing to pivot the handle towards a closed position to move the latch key against a proximal end of the slot adjacent the proximal end of the chassis to impart a docking force to the component housing and displace the component housing further into the component bay until a connector on the component housing has interfaced with a mating connector secured relative to the component bay.

17. The method of claim 16, further comprising the step of: locking the extendable handle in the closed position.

18. The method of claim 16, further comprising the step of:
pivoting the extendable handle from the closed position towards the open position to impart a dislodging force to the component housing and displace the component housing until the connector on the component housing disconnects from the mating connector; and
continuing to pivot the extendable handle toward the open position to simultaneously retract the latch key from the slot and deploy the latch stop arm.

19. The method of claim 16, wherein pivoting the extendable handle toward the closed position moves a latch stop arm to allow insertion of the disk drive carrier.

20. The method of claim 16, wherein the component housing contains a hard disk drive.

\* \* \* \* \*